May 8, 1951  E. R. SCOTT  2,551,975
AWNING

Filed Dec. 26, 1946  2 Sheets-Sheet 1

Ernest R. Scott
INVENTOR,
BY Loyal J. Miller
ATTORNEY

May 8, 1951   E. R. SCOTT   2,551,975
AWNING
Filed Dec. 26, 1946
2 Sheets-Sheet 2
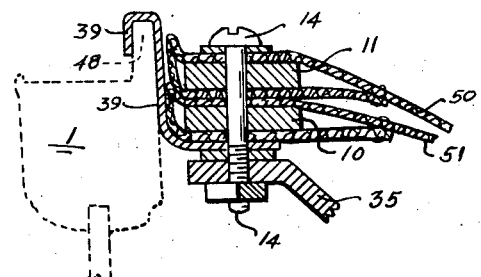
FIG. 3
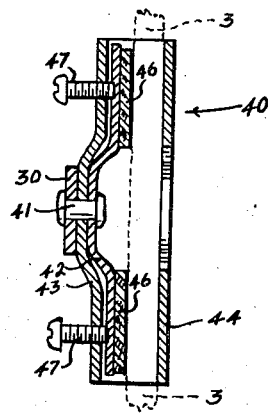
FIG. 4
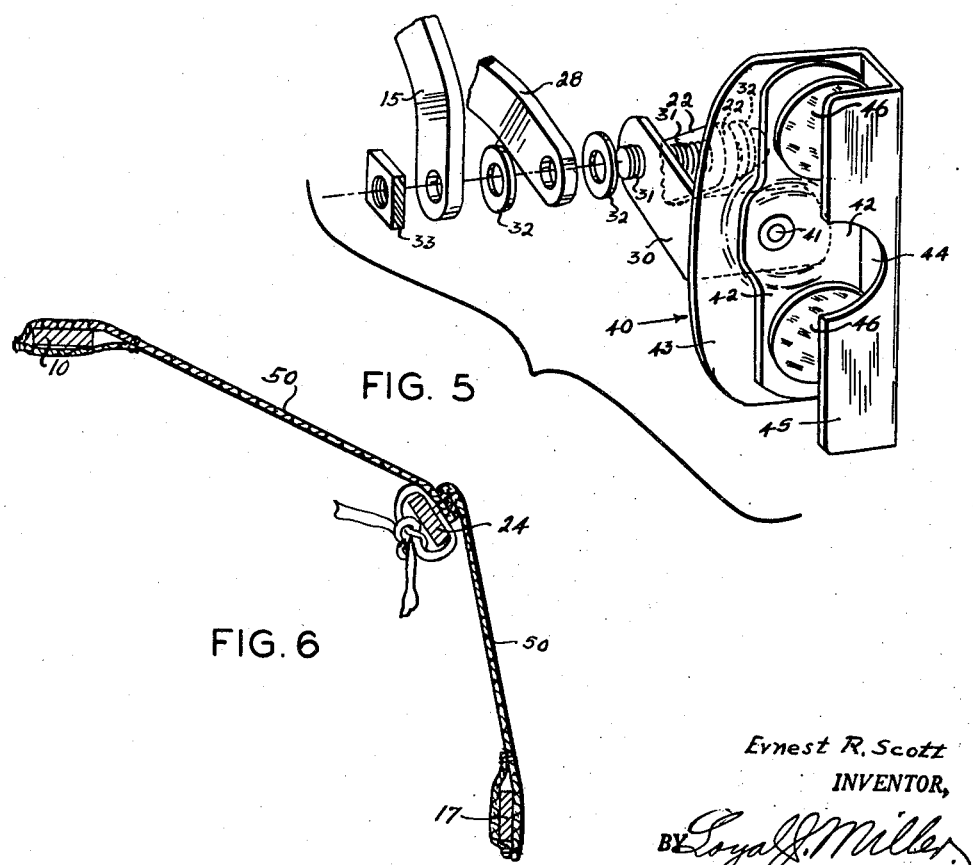
FIG. 5
FIG. 6
Ernest R. Scott
INVENTOR,
BY Loyal J. Miller
ATTORNEY Patented May 8, 1951

2,551,975

UNITED STATES PATENT OFFICE 2,551,975

AWNING

Ernest R. Scott, Oklahoma City, Okla.

Application December 26, 1946, Serial No. 718,430

3 Claims. (Cl. 160—56)

My invention relates to sun shades or awnings for window openings, and more particularly to awnings for vehicle window openings.

The present invention is a mechanical improvement over the awning disclosed in United States design patent numbered D. 109,106, and issued to me on the 29th day of March, 1938.

The awning of that patent was designed to attach to the upper portion of a vehicle door, but no provision was made for adjusting the length of the awning to accommodate doors of different horizontal dimensions.

It is the prime object of the present invention to provide a collapsible awning which is adjustable longitudinally, so as to accommodate different sized vehicle doors.

In commercializing the awning of the above mentioned patent, it was necessary to construct each awning to fit a specific door size. The present awning has sufficient longitudinal adjustment to render it usable upon practically any standard automobile door, thus making it unnecessary for a dealer to carry a stock of different sized awnings for different makes of cars.

Another object is to provide an awning of this class in which the sheet covering, as well as the supporting bows is longitudinally adjustable.

A further object is to provide a longitudinally adjustable awning which is simple and easy to adjust and install.

Other objects will be apparent from the following description when taken in conjunction with the accompanying two sheets of drawings, wherein:

Figure 3 is an enlarged vertical sectional view detailing the side-rib cover assembly at the longitudinal center of the awning;

Figure 4 is an enlarged sectional view taken substantially along a substantially vertical plane indicated by the line 4—4 of Figure 2;

Figure 5 is an exploded perspective view detailing the assembly of the bow ends and one of the two identical mounting brackets or clamps; and, Figure 6 is a transverse sectional view through the awning of Figure 1, and taken substantially along the line 6—6 thereof.

Like characters of reference designate like parts in those figures of the drawings in which they occur.

In the drawings:

Figure 1:
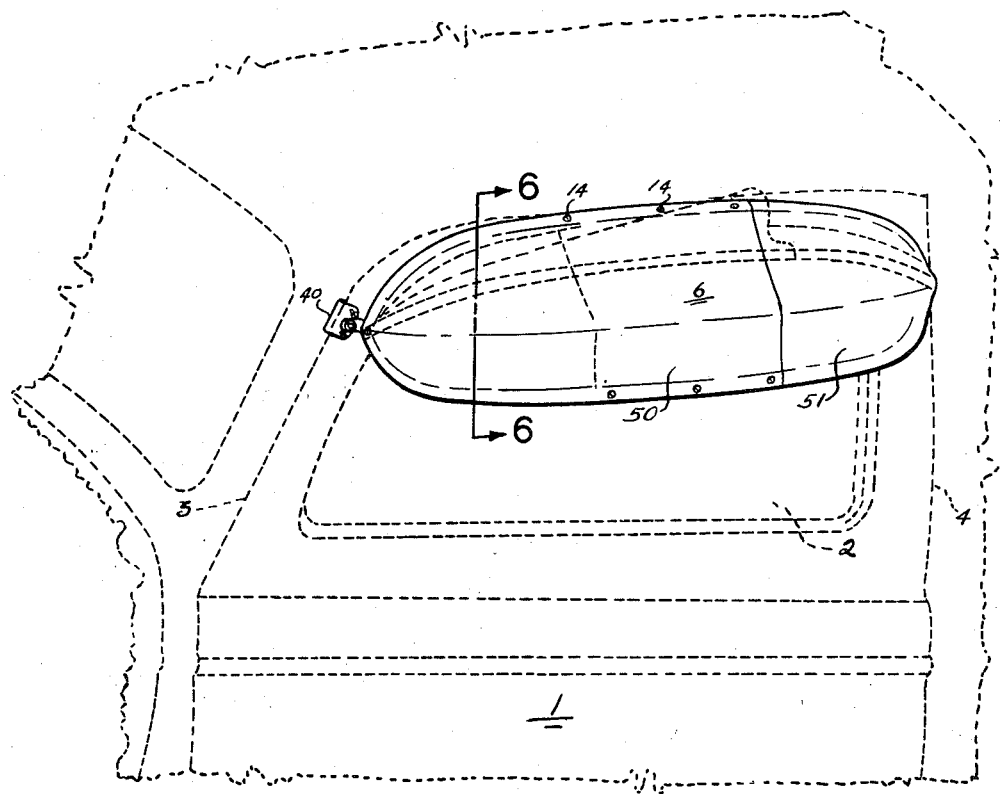
Figure 1 is a perspective view of the awning operatively installed upon an automobile door, a portion of the car being shown in dotted lines.

The reference numeral 1 indicates, as a whole, a vehicle door having a window opening 2, a front or forward edge 3, and a rear edge 4. The device of the present invention is designed for removable installation upon the door 1 above the window 2, is designed for clamping attachment to said door edges 3 and 4, and is further adapted for connection to the upper edge of the door.

The invention, per se, includes a ribbed metal frame which is indicated as a whole by the reference numeral 5, and a sheet cover therefor which is indicated by the numeral 6. The cover 6 may be made of any suitable sheet material such as leather, simulated leather, or cloth.

The frame 5 consists of an upper or inner bow 7, a lower or outer bow 8, and an intermediate or middle bow 9.

The upper bow 7 is formed of two strap-metal strips 10 and 11 which have over-lapping straight end portions which lie flatly in face to face contact with each other and each of which has a series of equally spaced through perforations. The perforations in the strip 10 are indicated by the reference numeral 12, and those through the strip 11 are indicated by the numeral 13. The two strips 10 and 11 may be moved longitudinally with relation to each other, and may be anchored together in various positions of longitudinal adjustment by a plurality of stove bolts or studs 14.

The end of the strip 10 is bent to form an arcuate portion 15, and the opposite end of the strip 11 is similarly bent to form an arcuate portion 16.

The lower bow 8 is similarly formed of two strap-metal strips 17 and 18, the adjacent end portions of which similarly over-lap, and are respectively provided with spaced through perforations 19 and 20 for receiving studs 21, for anchoring the strips together. The opposite ends of the strips 17 and 18 are bent to provide arcuate portions 22 and 23 respectively.

The middle bow 9 is formed of two strap-metal strips 24 and 25 which have their adjacent straight portions slidably thrust into a tubate element 26. The element 26 is preferably attached to the strip 24 by a rivet or pin 27.

The strip 24 has its other end bent to form an arcuate portion 28, and the opposite end of the strip 25 is similarly bent to form an arcuate portion 29.

Figure 2:
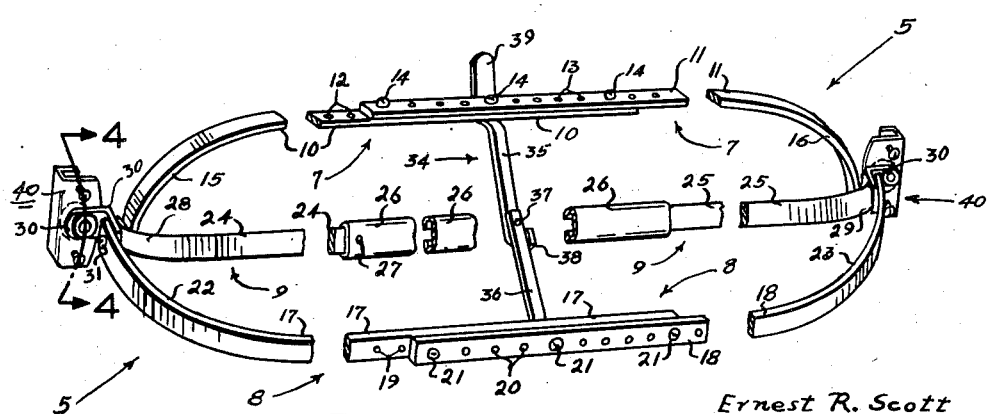
Figure 2 is a perspective view of the longitudinally adjustable awning frame, showing the bows or ribs thereof in open or spread apart condition.

In assembling the bows 7, 8 and 9 together to form the frame 5, the extreme ends of the arcuate portions 15, 22 and 28 are drawn together face to face and are all attached to an L-shaped bracket 29 by a pivot pin 31 (Figure 5). Suitable separating washers 32 are provided around the pivot pin or bolt 31, if desired, and a nut 33 acts to hold the assembly in place. The extreme ends of the arcuate portions 16, 29 and 23 of the strips 11, 25 and 18 are similarly mounted together upon another one of the brackets 30 (Figure 2).

The frame 5 further includes an arm 34 which is also preferably made of strap-iron, and which extends transversely between the bows 7 and 8, and which is pivotally attached to the bows by one each of the detents 14 and 21. The arm 34 is made of two strips 35 and 36 which are pivoted together by a pivot pin 37 to form an elbow joint. A projection 38 on the strip 35 acts to limit movement of the joint to only one direction. The upper end of the strip 35 is attached to bow strips 10 and 11 by one of the bolts 14 (Figure 3), and an extension plate 39 is also attached thereto by the bolt. The plate 39 projects above the bow strips for a purpose more fully described hereinbelow.

As best illustrated in Figures 4 and 5, each of the brackets 30 are made of angle iron and have a portion or leg extending at right angles to the portion which receives the bolt or pin 31. This latter leg lies flatly against the outside surface of a sheet metal clamp-hook 40, and is pivotally connected thereto by a rivet 41 which also passes through a plate 42 lying flatly against the inside surface of the hook member.

The hook member 40 consists substantially of a metal plate 43 (the one through which the rivet 41 passes), a perpendicularly bent portion 44, and a return portion 45 which is bent into a position of parallelism with the plate 43. The inside surface of the plate 42 is equipped with two cork or felt pads 46 which are preferably attached thereto by adhesive.

In installing the frame 5 on a vehicle door, one of the clamp members 40 is hooked around the forward edge 3 of the door and the other one is similarly hooked around the door's rear edge 4. The perforations 12—13 and 19—20 in the bow strips make it possible to shift the two clamps toward or away from each other to accommodate different door dimensions. The edge of the door is shown in dotted lines in Figure 4.

After the clamps have been thus engaged with the door edges, the plate 42 and pads 46 are forcibly urged toward the door edge by two studs 47 which are threaded into perforations in the plate 43 and the ends of which bear against the outside surface of the plate 42.

After the frame 5 has thus been attached to the door, the upper projecting end portion of the plate 39 is bent downwardly over the upper edge 49 of the door (Figure 3).

In completing the device, the frame 5 is covered by a sheet of pre-tailored material, such as leather, simulated leather, oil cloth or waterproofed canvas. This sheet covering is formed in two sheets 50 and 51 having hemmed edge tunnels through which the strips 10, 11, 17 and 18 may be passed. The sheets 50 and 51 overlap each other so as to compensate for the longitudinal adjustment of the bow strips in an obvious manner. The bolts 14 pass through the sheets 50 and 51 as best shown in Figure 3.

The bow 8 may be swung upwardly adjacent the bow 7 by breaking the brace 34 at its elbow joint. When this is done, the covering 6 folds upon itself in an obvious manner.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A vehicle door awning including, a plurality of elongated bows having similar arcuate end portions; means for pivotally connecting the corresponding ends of said bows together; a hook element pivotally connected to the bows at each end thereof; means embodied in each bow for facilitating its longitudinal expansion and contraction; and sheet material stretched across all of said bows, and a transverse brace arm extending between two of said bows and pivoted thereto at each of its ends, said arm composed of two strips hinged together at their meeting ends.

2. In a foldable automotive vehicle door awning comprising a plurality of longitudinally extensible frame members having similar arcuate end portions, means for pivotally connecting the corresponding ends of said frame members together, means pivotally connected to the frame members at each end thereof to provide adjustment on the vehicle, a plurality of overlapping sheets carried by the frame members, and means cooperating with each of the frame members to provide longitudinal adjustment thereof, and a transverse pivotable member disposed between the outer two of said frame members.

3. In an awning for an automotive vehicle door comprising a plurality of adjustable elongated bow members having arcuate end portions, means for pivotally interconnecting the corresponding ends of said bows, a hook element pivotally connected to the corresponding end of said bows, means providing variable longitudinal adjustment of the bows, and a transverse brace arm extending between two of said bows and pivoted thereto at each of its ends, said arm composed of two strips hinged together at their meeting ends.

ERNEST R. SCOTT.

REFERENCES CITED

The following references are of record in the file of this patent:

UNITED STATES PATENTS

| Number | Name | Date |
|---|---|---|
| 619,957 | Hettrick | Feb. 21, 1899 |
| 827,483 | Voorhees | July 31, 1906 |
| 1,666,657 | Hopkins | Apr. 17, 1928 |
| 2,249,491 | O'Brien | July 15, 1941 |